(12) United States Patent
Hayakawa et al.

(10) Patent No.: US 7,850,198 B2
(45) Date of Patent: Dec. 14, 2010

(54) KNEE PROTECTION APPARATUS FOR VEHICLE OCCUPANT

(75) Inventors: Tatsuya Hayakawa, Toyota (JP); Eiichi Yamada, Nissin (JP); Hitoshi Kondo, Kariya (JP)

(73) Assignee: Toyota Jidosha Kabushiki Kaisha, Nagoya (JP)

( * ) Notice: Subject to any disclaimer, the term of this patent is extended or adjusted under 35 U.S.C. 154(b) by 1017 days.

(21) Appl. No.: 10/542,648

(22) PCT Filed: Jan. 23, 2004

(86) PCT No.: PCT/IB2004/000166

§ 371 (c)(1),
(2), (4) Date: Jul. 19, 2005

(87) PCT Pub. No.: WO2004/065178

PCT Pub. Date: Aug. 5, 2004

(65) Prior Publication Data

US 2006/0071459 A1 Apr. 6, 2006

(30) Foreign Application Priority Data

Jan. 24, 2003 (JP) .............................. 2003-016199

(51) Int. Cl.
*B60R 21/016* (2006.01)
(52) U.S. Cl. ..................................... 280/730.1; 280/752
(58) Field of Classification Search .................. 280/752, 280/730.1, 730.2, 731, 732, 728.1
See application file for complete search history.

(56) References Cited

U.S. PATENT DOCUMENTS

| | | | | |
|---|---|---|---|---|
| 3,702,706 A | * | 11/1972 | Sobkow | 280/730.1 |
| 3,768,830 A | * | 10/1973 | Hass | 280/729 |
| 4,290,627 A | * | 9/1981 | Cumming et al. | 280/729 |
| 5,464,250 A | * | 11/1995 | Sato | 280/743.1 |
| 5,803,495 A | | 9/1998 | Jackson et al. | |
| 5,971,431 A | * | 10/1999 | Wohllebe et al. | 280/732 |
| 6,092,836 A | * | 7/2000 | Saslecov | 280/730.1 |
| 6,299,202 B1 | * | 10/2001 | Okada et al. | 280/732 |
| 6,354,620 B1 | * | 3/2002 | Budden et al. | 280/728.1 |
| 6,435,554 B1 | * | 8/2002 | Feldman | 280/743.2 |
| 7,147,247 B2 | * | 12/2006 | Hayakawa | 280/740 |
| 7,182,365 B2 | * | 2/2007 | Takimoto et al. | 280/730.1 |
| 7,201,395 B2 | * | 4/2007 | Nagata et al. | 280/730.1 |
| 7,213,834 B2 | * | 5/2007 | Mizuno et al. | 280/730.1 |
| 7,226,075 B2 | * | 6/2007 | Nagata et al. | 280/731 |

(Continued)

FOREIGN PATENT DOCUMENTS

JP      A 05-208646      8/1993

(Continued)

OTHER PUBLICATIONS

Japanese Office Action for Japanese Patent Application No. 2003-016199 with English Translation.

*Primary Examiner*—Paul N. Dickson
*Assistant Examiner*—Timothy Wilhelm
(74) *Attorney, Agent, or Firm*—Oliff & Berridge, PLC

(57) ABSTRACT

A knee protection apparatus includes an airbag and an airbag support that is attached to the airbag. Upon deployment of the airbag, the airbag support together expands so as to cover the instrument panel and thus help the airbag smoothly expand.

27 Claims, 28 Drawing Sheets

U.S. PATENT DOCUMENTS

| | | | |
|---|---|---|---|
| 7,232,149 B2* | 6/2007 | Hotta et al. | 280/730.1 |
| 7,261,318 B2* | 8/2007 | Enders | 280/732 |
| 7,314,231 B2* | 1/2008 | Abe et al. | 280/730.1 |
| 7,314,232 B2* | 1/2008 | Kashiwagi | 280/730.1 |
| 2004/0164527 A1* | 8/2004 | Nagata et al. | 280/730.1 |
| 2004/0262896 A1* | 12/2004 | Mizuno et al. | 280/730.1 |
| 2005/0062264 A1* | 3/2005 | Arwood et al. | 280/730.1 |
| 2005/0212275 A1* | 9/2005 | Hasebe | 280/743.1 |
| 2007/0267852 A1* | 11/2007 | Enders | 280/730.1 |

FOREIGN PATENT DOCUMENTS

| | | |
|---|---|---|
| JP | A 10-315894 | 12/1998 |
| JP | A 11-321539 | 11/1999 |
| JP | A-2000-062562 | 2/2000 |
| JP | A-2001-114061 | 4/2001 |
| JP | A-2002-127862 | 5/2002 |
| JP | A 2002-249016 | 9/2002 |
| JP | A 2002-337653 | 11/2002 |

* cited by examiner

F I G . 47
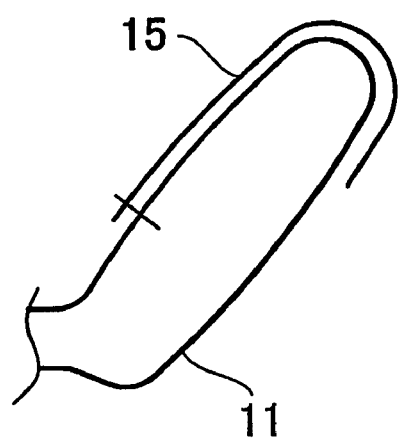
F I G . 48
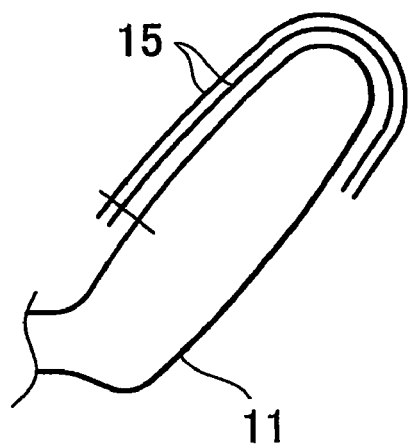
F I G . 49
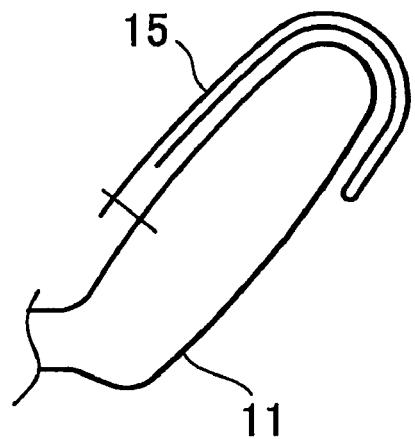

F I G . 50
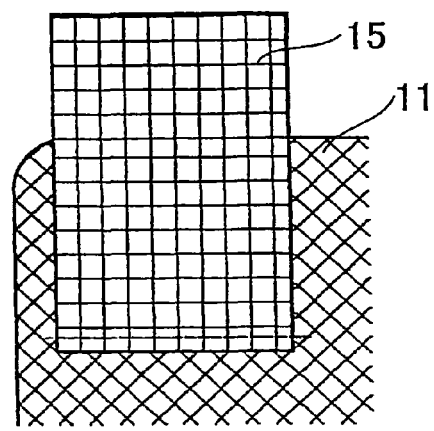
F I G . 51
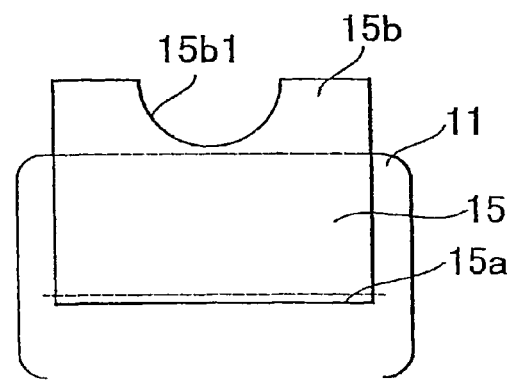

KNEE PROTECTION APPARATUS FOR VEHICLE OCCUPANT

BACKGROUND OF THE INVENTION

1. Field of the Invention

The present invention relates to a vehicle occupant protection apparatus, and more specifically, it relates to a knee protection apparatus for a vehicle occupant, which protects the occupant's knees by deploying an airbag stored in front of the knees using the gas from an inflator upon collision of the vehicle.

2. Description of the Related Art

A known protection apparatus of this kind (e.g., Japanese Laid-open Patent Application No. 2002-249016) includes an airbag that is provided wrapped in front of the knees of an occupant and, when supplied with gas from an inflator, develops along the surface of the instrument panel to expand between the instrument panel and the occupant's knees.

However, there is only a small space allowed for such deployment of the airbag, namely between the instrument panel and the knees of the occupant, and what is more, there are protrusions and indentations on the instrument panel side, such as those formed to provide good appearance of the instrument panel and formed by some related parts attached thereon, and it is therefore considered that the airbag would get caught on such protrusions and indentations when it expands as aforementioned.

SUMMARY OF THE INVENTION

The present invention has been made to provide a knee protection apparatus for a vehicle occupant which solves the aforementioned problem. A first aspect of the invention relates to a knee protection apparatus for a vehicle occupant, including: an airbag that is disposed in front of a knee of the occupant; an inflator that supplies gas to the airbag upon collision of the vehicle so that the airbag is deployed by the gas supplied; and an airbag support that expands upon deployment of the airbag so as to cover an instrument panel of the vehicle.

According to this construction, when the airbag is deployed by the gas supplied from the inflator, the airbag support covers protrusions and indentations on the surface of the instrument panel so that the airbag would not be caught on them when it expands towards its target position. In this way, the airbag support helps the airbag expand smoothly and quickly upon its deployment.

It is preferable that the airbag support be attached to the airbag. According to this construction, the expanding force of the airbag quickly acts on the airbag support, so that the airbag support quickly expands to cover the instrument panel.

Also, it is preferable that the airbag support include a temporarily attached portion that is detached from the airbag upon deployment of the airbag. According to this construction, the temporarily attached portion is detached from the airbag due to the expanding force of the airbag upon its deployment, and at this time, the temporarily attached portion becomes free and then expands with respect to the instrument panel quickly.

Also, it is preferable that the airbag support include an instrument panel side portion provided to one side of the airbag that is closer to the instrument panel and an occupant side portion provided to the other side of the airbag that is closer to the occupant. According to this construction, the airbag support covers protrusions and indentations present in the occupant's side, as well as those present in the instrument panel side so that the airbag can expand more smoothly.

In this case, the airbag support may include a cut-off portion at which the airbag support is split. According to this construction, the airbag support can be provided in an integrated form, namely as a single component. That is, upon deployment of the airbag, the airbag support is split at the cut-off portion into the instrument panel side portion and the occupant side portion due to the expanding force of the airbag, and the released end portions of the instrument panel portion and the occupant side portion then moves quickly.

It is also preferable that the instrument panel side portion and the occupant side portion of the airbag support be temporarily attached to each other, so that they are detached upon deployment of the airbag. According to this construction, upon deployment of the airbag, the instrument side portion and the occupant side portion of the airbag support are detached from each other due to the expanding force of the airbag. According to this construction, the size of each portion can be easily set so as to be suitable for its functional requirement.

Also, it is preferable that the instrument panel side portion and the occupant side portion be arranged such that the instrument side portion would expand before the occupant side portion upon deployment of the airbag. According to this construction, the instrument panel side portion is made expand before the occupant side portion, which is advantageous in a case where priority should be given to covering protrusions and indentations on the instrument panel.

Also, it is preferable that the airbag support include an expansion guide for guiding expansion of the airbag support. In this case, upon deployment of the airbag, the airbag support is guided by the expansion guide so that it stably expands in a preferred direction.

For example, the expansion guide may be formed by a guide stitch sewing the airbag and airbag support together. At least one portion of the guide stitch extends along a direction the airbag support would expand upon deployment of the airbag. This construction is advantageous in terms of cost.

The guide stitch can be automatically formed by manufacturing the airbag if one portion of a stitch made to form the airbag or sew a tether to the airbag is used to form the guide stitch.

Also, the expansion guide may be formed by a reinforcement of the airbag support, at least one portion of which extending along a direction the airbag support would expand upon deployment of the airbag. The reinforcement may be formed separated from the airbag support, and therefore can be easily formed in a preferred shape, namely the reinforcing effect by the reinforcement can be flexibly set.

The reinforcement may be formed by a portion of the airbag support that is sewn into a specific form or at which a stitch is made. In this case, the equipment for sewing the airbag can be utilized to produce the reinforcement, so that no additional equipment cost will therefore be required. Also, the reinforcement may be formed by a portion of the airbag support on which sealing substance is applied. In this case, too, the equipment for applying sealing substance to the airbag can be utilized to produce the reinforcement, and therefore no additional equipment cost will be required.

Meanwhile, it is preferable that the airbag support be a portion of a cover for covering the opening of an airbag case in which the airbag is stored. This construction does not increase the number of necessary parts and components, and is therefore advantageous in terms of cost. Also, it is preferable that the airbag support and the airbag be integrally formed of a common base cloth. This construction also does not increase the number of necessary parts and components, and is therefore advantageous in terms of cost.

If the airbag support attached on the airbag is stored wrapped separately from the airbag, it is possible to freely arrange the airbag support so that it would take a desired expanding behavior upon deployment of the airbag, independent of the expanding behavior of the airbag.

Also, it is preferable that the airbag support be attached at its bottom portion to the airbag, and the airbag support and the airbag be stored with the top portion of the airbag support being separately fold from the airbag. In this case, the top portion of the airbag support would expand, upon deployment of the airbag, without being restricted by the airbag, and therefore the airbag support expands before the airbag.

Also, it is preferable that an airbag case be provided, and the airbag and the airbag support be wrapped separately from each other and stored in the airbag case in such a way that the airbag support covers the airbag in the same case. With this arrangement, the airbag support holds the airbag, thus reducing the chances of the airbag being displaced or deformed.

Also, it is preferable that an airbag case for storing the airbag be provided, and the instrument side portion and the occupant side portion of the airbag support be wrapped separately and stored within the airbag case together with the airbag in such a way that, in the same case, the airbag wrapped is covered by the occupant side portion and the occupant side portion is covered by the instrument panel side portion. According to this construction, the airbag is supported by the support of the instrument panel side portion and the occupant side portion, reducing the chances of the airbag being displaced or deformed. Also, upon deployment of the airbag, the instrument panel side portion expands before the occupant side portion.

Also, it is preferable that one end portion of the airbag support be free and an anchor portion be provided at the same end. According to this construction, the expanding force of the airbag acts on the anchor portion so that the airbag support quickly expands with respect to the instrument panel. The anchor portion, for example, may be formed by applying sealing substance to the airbag support. In this case, the equipment for applying sealing substance to the airbag can be utilized to provide the anchor portion, and no additional equipment cost will therefore be required. Alternatively, the anchor portion may be formed by sewing one portion of the airbag support into a specific form. In this case, similarly, the equipment for sewing the airbag can be utilized to provide the anchor portion, and therefore no additional equipment cost will be required.

Also, it is preferable that the airbag support be provided with a friction reducer for reducing friction between the airbag support and the airbag. The friction reducer is provided to minimize or reduce the chances that the airbag support would get caught on the airbag upon deployment of the airbag. For example, the friction reducer may be formed by applying sealing substance to one side of the airbag support closer to the airbag. In this case, due to the sealing substance applied, the relative movements of the airbag and the airbag support can be made smoother. In this case, namely, the sealing substance can be utilized to reduce the friction between the airbag and the airbag support.

Also, it is preferable that the friction reducer be formed by a portion of the airbag support that is folded onto another portion (overlapped portions) of the airbag support. Due to the thus folded portion of the airbag support, the relative movements of the airbag and the airbag support are made smooth, and therefore the airbag support can smoothly expand with respect to the instrument panel. Also, the friction reducer may be formed through an arrangement of the airbag support and the airbag where a weave direction of base cloth of the airbag and a weave direction of base cloth of the airbag support are different This arrangement can be easily accomplished by appropriately setting the direction of cutting out the airbag support from its base cloth.

Also, it is preferable that the airbag support be attached at the bottom portion to the airbag while the top portion is free, and a peripheral length of a top side of the airbag support be longer than a peripheral length of a bottom side of the airbag support. According to this construction, even if there is a protrusion such as a steering column at a position corresponding to the top portion, the airbag support can appropriately expand while avoiding the protrusion.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein:

FIG. 47 is a sectional side view schematically illustrating one example where a friction reducer is formed by a layer of sealing substance created on one side of the airbag support closer to the airbag;

FIG. 48 is a sectional side view schematically illustrating one example where the friction reducer is formed by overlapped portions of the airbag support;

FIG. 49 is a sectional side view schematically illustrating another example where the friction reducer is formed by overlapped portions of the airbag support;

FIG. 50 is a view schematically illustrating one example where the friction reducer is formed through an arrangement of the airbag support and the airbag where a weave direction of base cloth of the airbag and a weave direction of base cloth of the airbag support are different;

FIG. 51 is a view schematically illustrating one example where the peripheral length of the top side of the airbag support is made longer than the bottom side of the airbag support by forming a half-round notch substantially at the center of the same top side;

DETAILED DESCRIPTION OF THE PREFERRED EMBODIMENTS

Figure 1:
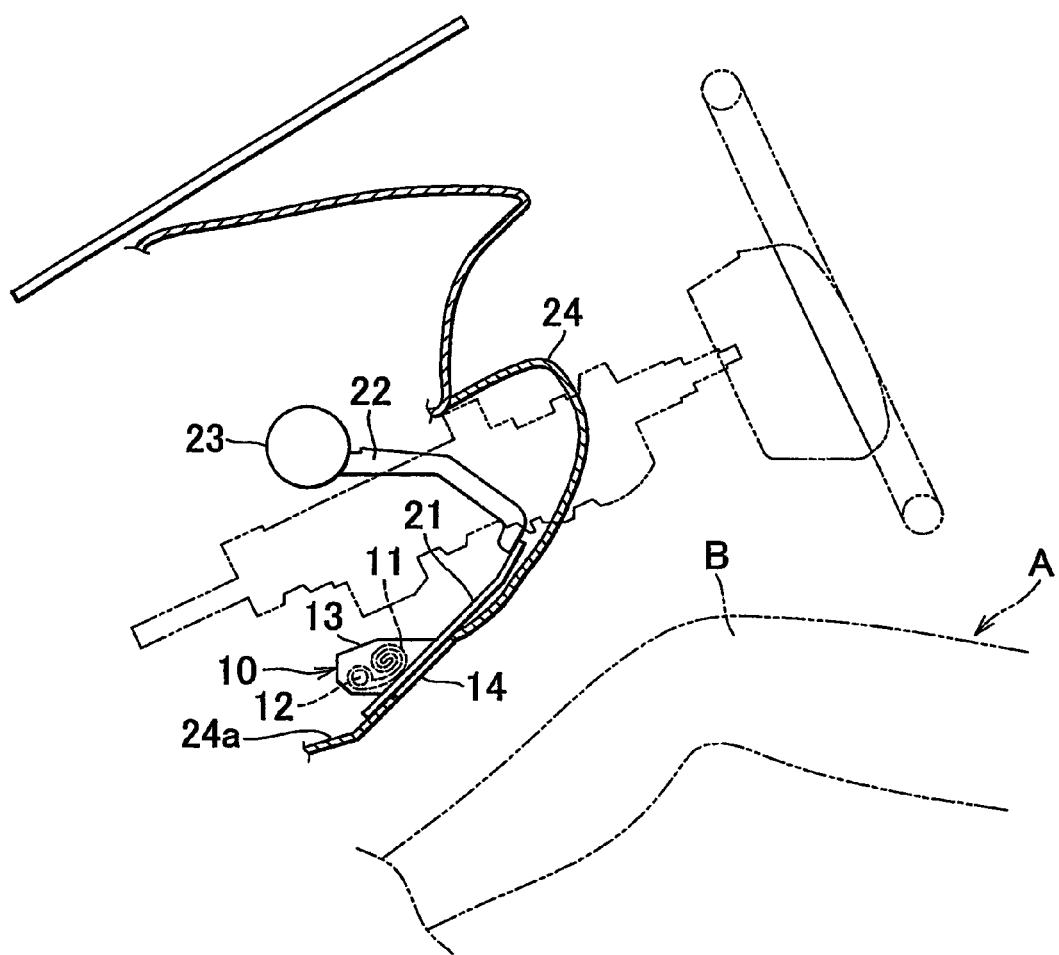
FIG. 1 is a side view schematically showing a knee protection apparatus in accordance with one embodiment of the present invention.

Hereinafter, exemplary embodiments of the present invention will be described with reference to the accompanying drawings. FIGS. 1 to 5 are views schematically showing the configuration of a knee protection apparatus for a vehicle occupant in accordance with one embodiment of the invention. According to this embodiment, a knee airbag module 10 is fixed, at substantially the same height as knees B of an occupant A, to an instrument panel reinforcement 23 via a panel 21 and right and left brackets 22, and to a bottom portion 24A of an instrument panel 24 via the panel 21.

Figure 3:
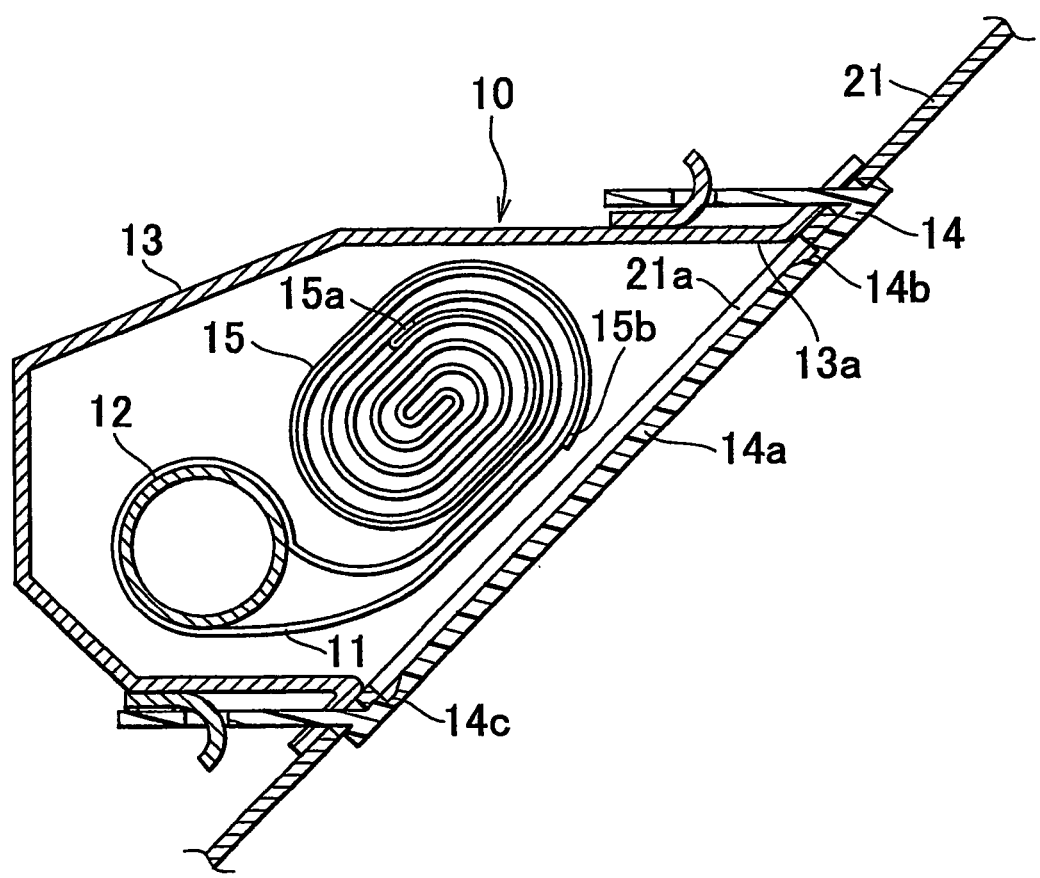
FIG. 3 is an sectional side view showing the knee airbag module shown in FIG. 1.

The knee airbag module 10 thus located in front of the knees B of the occupant A, includes an airbag 11, an inflator 12 for supplying gas to the airbag 11 upon collision of the vehicle, an airbag case 13 for storing the airbag 11 and the inflator 12, and an airbag cover 14 covering a rear opening 13a of the airbag case 13 (see FIG. 3).

The airbag 11 is formed of woven cloth (i.e., base cloth) sewn into a wide rectangular shape as viewed from the occupant side. The airbag 11 thus formed is then wrapped and stored into the airbag case 13 as shown in FIGS. 1, 3. When deployed, the airbag 11 is ejected from the airbag case 13 and develops towards the rear side of the vehicle, and then upward thus expanding between the instrument panel 24 and the knees B of the occupant A to protect the same knees. Also, sealing substance (e.g., silicon) is applied to the surface of the airbag 11 to improve the airtightness.

The inflator 12, installed within the airbag case 13 together with the airbag 11, is used to supply gas into the airbag 11 upon collision of the vehicle. The airbag case 13 has a rectangular shape and is made of metal plates. In the rear side of the airbag case 13 is formed the rear opening 13a facing toward the rear side of the vehicle, and the airbag case 13 is attached to the panel 21 in such a way that the rear opening 13a and an opening 21A formed in the lower portion of the panel 21 are aligned.

The airbag cover 14 is a resin-made cover having a wide rectangular shape as viewed from the occupant's side, and is attached to the airbag case 13 and the panel 21 so as to cover the rear opening 13a of the airbag case 13 and the opening 21a of the panel 21. The airbag cover 14 includes a door portion 14a having a wide rectangular shape and provided in a position corresponding to the rear opening 13a of the airbag case 13 and the panel 21a of the panel 21. Also, a cut-off line 14b of small thickness is formed along the upper, left, and right edges of the door portion 14a, and a hinge portion 14c of relatively small thickness is formed along the lower edge of the door portion 14a, so that the door portion 14a opens downward upon deployment of the airbag 11.

Figure 2:
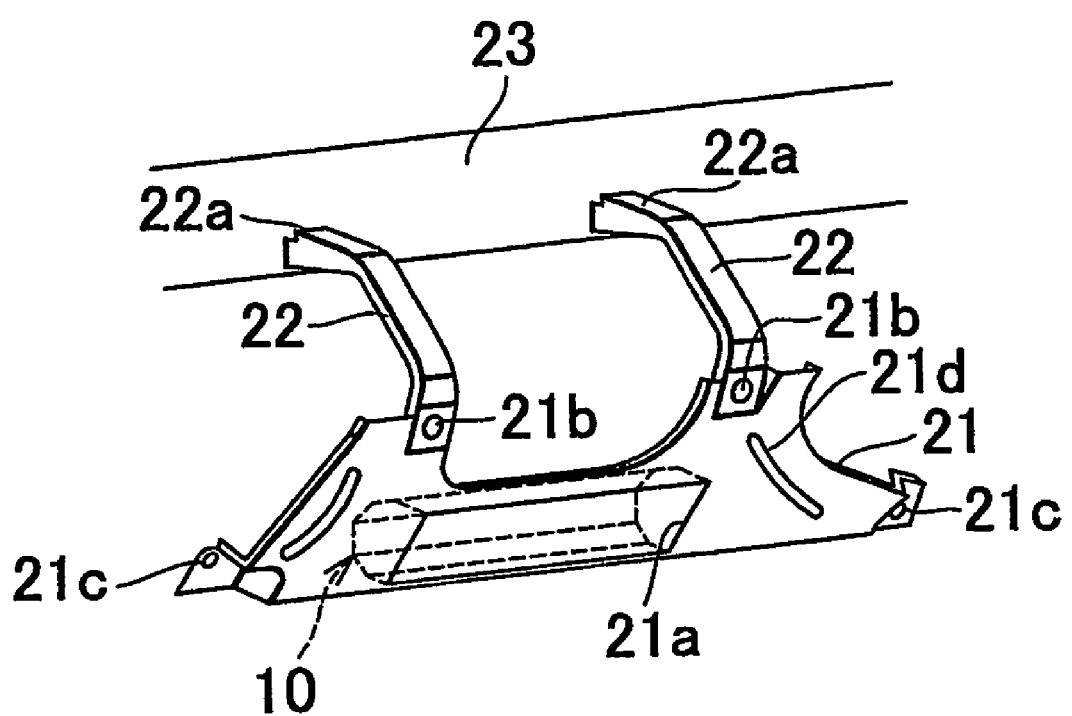
FIG. 2 is a perspective view showing the configuration of a knee airbag module, a panel, brackets, and an instrument panel reinforcement.

The panel 21 is a thin plate plastically deformable to absorb stress. Referring to FIG. 2, the panel 21 is attached at upper mount portions 21b to the rear end portions of the brackets 22, and at a lower mount portion 21c to the lower end portion of the instrument panel 24. Also, beads 21d (i.e., reinforcement portions) extending substantially in the vertical direction are formed in the right and left sides of the panel 21, respectively.

Each bracket 22 is made of a relatively thick plate plastically deformable to absorb stress. Referring to FIGS. 1, 2, each bracket 22 is fixed at a tip 22a to the panel 21 and includes two bent portions bending downward.

Furthermore, the knee protection apparatus of this embodiment includes an airbag support 15 attached to a specific portion of the airbag 11. The airbag support 15 is made of woven cloth of the same kind as the airbag 11 and has an elongated shape. More specifically, the airbag support 15 is attached at its bottom portion 15a to the airbag 11, and is stored wrapped within the airbag case 13 together with the airbag 11. For example, the airbag support 15 may be sewn to the airbag 11, or may be bonded to the airbag using adhesive (e.g., thermal adhesive).

Figure 4:
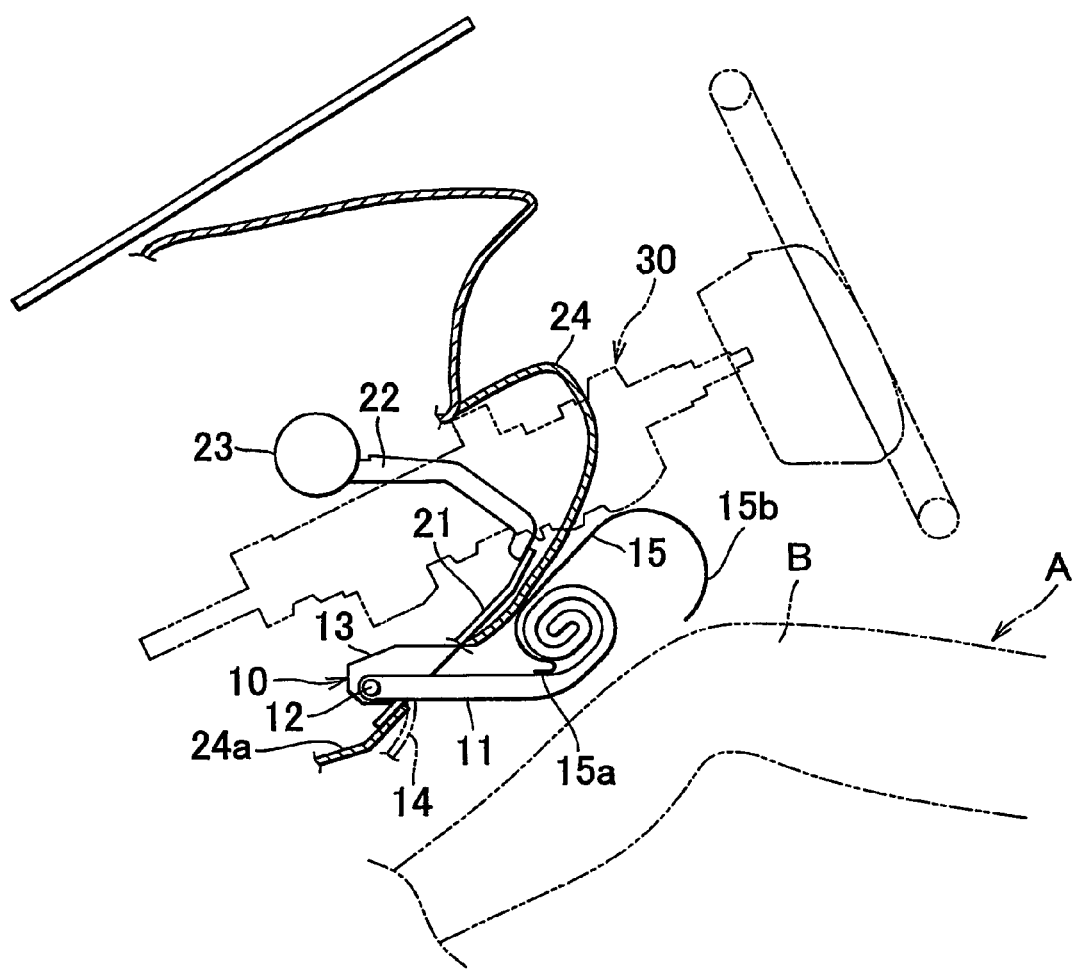
FIG. 4 is another side view schematically showing the knee protection apparatus shown in FIG. 1 when the airbag is deploying.
Figure 5:
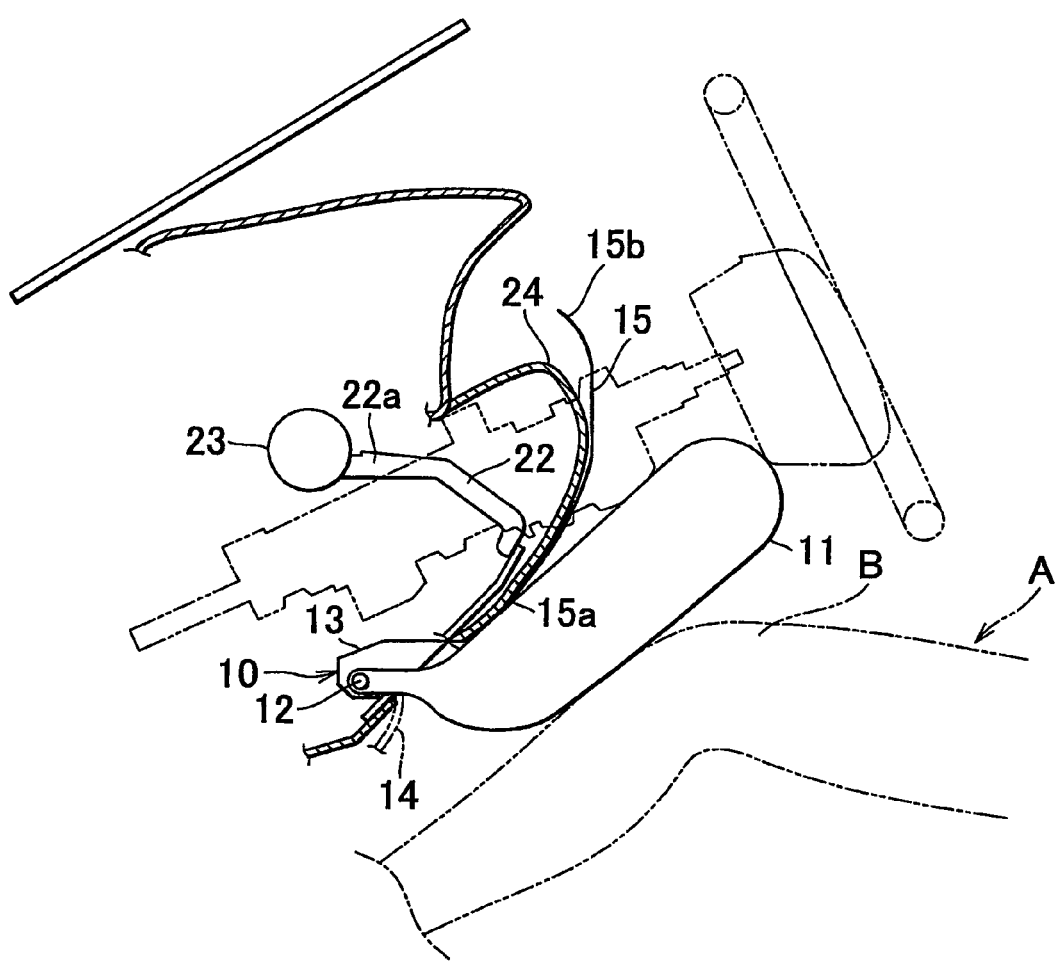
FIG. 5 is another side view schematically showing the knee protection apparatus when the deployment of the airbag has been completed.

Referring to FIGS. 4, 5, when the airbag 11 is deployed by the gas supplied from the inflator 12, the airbag support 15 expands in such a way that a top portion 15b (i.e., free end portion) of the airbag support 15 moves upward so that the airbag support 15 covers protrusions and indentations on the instrument panel 24, helping the airbag 11 smoothly expand during its deployment. Thus, the airbag support 15 reduces the chances of the airbag 11 being caught on such protrusions and indentations on the instrument panel 24, thereby assuring quick deployment of the airbag 11.

Also, since the airbag support 15 is attached to the airbag 11, upon deployment of the airbag 11, the expanding force of the airbag 11 quickly acts on the airbag support 15 and the airbag support 15 quickly cover the instrument panel 24.

Figure 6:
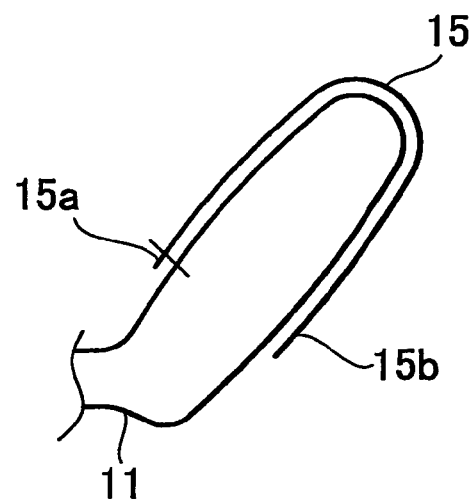
FIG. 6 is a sectional side view schematically illustrating one example where the airbag support is provided to both the instrument panel side and the occupant side of the airbag.
Figure 7:
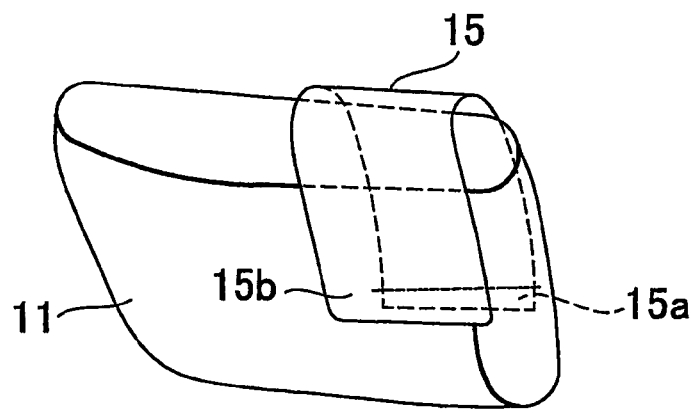
FIG. 7 is a perspective view showing the airbag and the airbag support of FIG. 6 as viewed from the rear side of the vehicle.

According to the foregoing construction, the airbag support 15 is arranged to expand with respect to the instrument panel side of the airbag 11. However, referring to FIGS. 6, 7, the airbag support 15 may alternatively be arranged such that the bottom portion 15a of the airbag support 15 expands with respect to the instrument panel side of the airbag 11 and the top portion 15b expands with respect to the occupant side of the airbag 11, respectively. In this case, as well as protrusions and indentations on the instrument panel 24, those present in the occupant side of the airbag 11 are covered by the airbag support 15, which reduces the chances of the airbag 11 being caught on them during deployment of the airbag 11.

Figure 8:
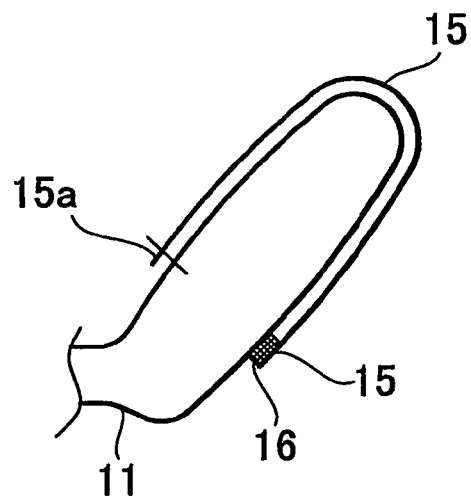
FIG. 8 is a sectional side view schematically illustrating one example where one end portion of the airbag support is temporarily fixed to the airbag using a double-daces tape.

While the top portion 15b (i.e., free end portion) of the airbag support 15 is not fixed to the airbag 11 in the examples of FIGS. 1 to 5, it may temporarily be fixed to the airbag 11 using a double-sided tape 16, or the like (See FIG. 8). In this case, upon deployment of the airbag 11, the top portion 15b is detached from the airbag 11 as the airbag support 15 expands by the expanding force of the airbag 11, and the detached top portion 15b then quickly moves towards the instrument panel 24.

Figure 9:
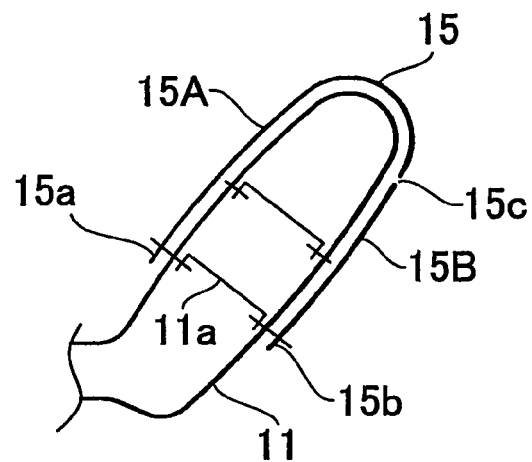
FIG. 9 is a sectional side view schematically illustrating one example where a cut-off line is provided at an intermediate portion of the airbag support.
Figure 10:
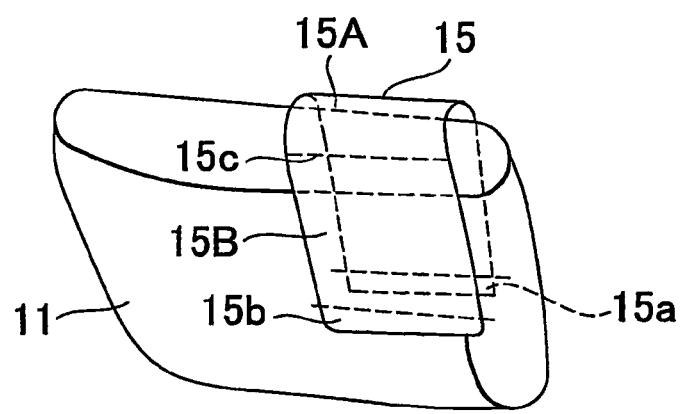
FIG. 10 is a perspective view showing the airbag and the airbag support of FIG. 9 as viewed from the occupant's side.

FIGS. 9, 10 show examples where the top portion 15b is sewn to the airbag 11 and a cut-off line 15c is provided at an intermediate portion of the airbag support 15.

In this case, upon deployment of the airbag 11, the airbag support 15, receiving the expanding force of the airbag 11, is split at the cut-off line 15c into an instrument panel side portion 15A and an occupant side portion 15B, and the top portion of each portion then quickly moves.

According to this construction, the two separate portions 15A, 15B are provided in an integrated form and attached to the airbag 11. In the example of FIG. 9, a tether 11a is sewn and thus fixed to the inside of the airbag, and the thread sewing the tether 11a to the airbag 11 is utilized to sew the airbag support 15 to the airbag 11.

Figure 11:
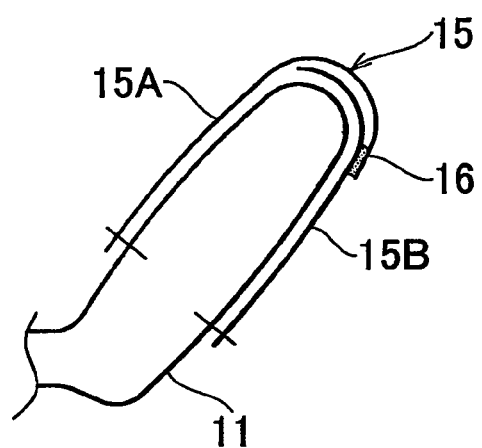
FIG. 11 is a sectional side view schematically illustrating one example where the instrument panel side portion and the occupant side portion of the airbag support are temporarily fixed to each other using double-sided tape.
Figure 12:
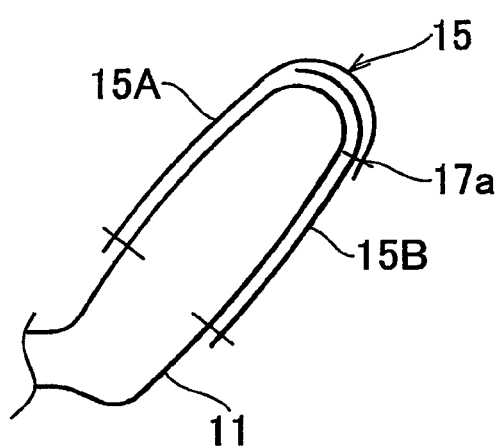
FIG. 12 is a sectional side view schematically illustrating one example where the instrument panel side portion and the occupant side portion of the airbag support are sewn and thus temporarily fixed to each other.

While the airbag support 15, in the above examples, is provided in an integrated form and is split at the cut-off line 15c into the instrument panel side portion 15A and the occupant side portion 15B upon deployment of the airbag 11, these portions may be provided separated, as in the examples shown in FIGS. 11, 12.

Referring to FIG. 11, the instrument panel side portion 15A and the occupant side portion 15B are temporally fixed to each other via a double-sided tape 16, such that the bottom portion 15a would expand before the free end portion 15b upon deployment of the airbag 11.

Meanwhile, referring to FIG. 12, the instrument panel side portion 15A and the occupant side portion 15B are sewn and thus temporarily fixed to each other, such that the instrument panel side portion 15A would expand before the occupant side portion 15B upon deployment of the airbag 11.

Figure 13:
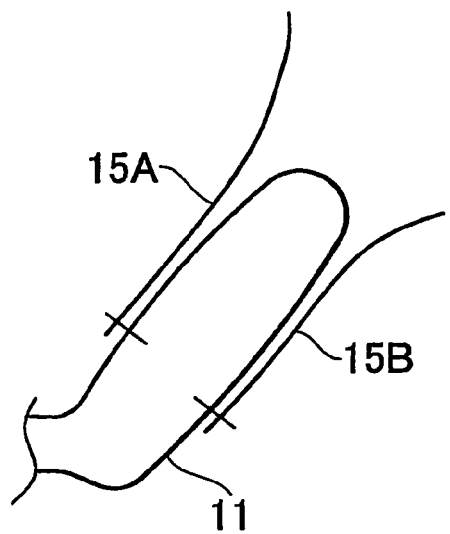
FIG. 13 is a sectional side view illustrating a case where the airbag support of FIG. 12 has expanded.

According to these constructions, the temporarily fixed instrument panel side portion 15A and occupant side portion 15B are separated due to the expanding force of the airbag 11 upon its deployment as shown in FIG. 13, and at this time the instrument panel side portion 15A expands before the occupant side portion 15B. Such an arrangement, in particular, is effective in a case where priority should rather be given to covering protrusions and indentations on the instrument panel 24, than covering those present in the occupant side.

Figure 14:
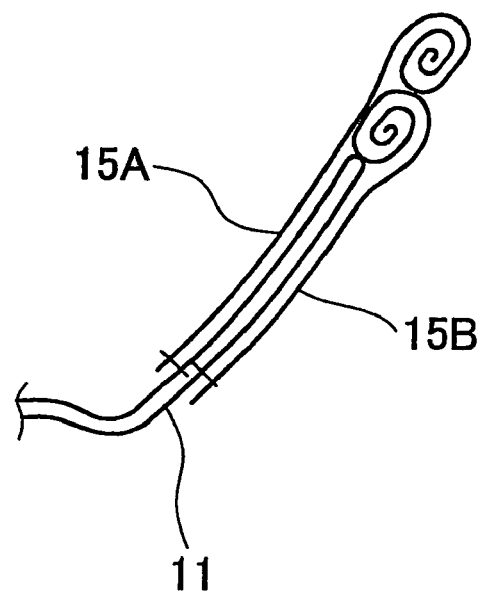
FIG. 14 is a sectional side view schematically illustrating one example where the instrument panel side portion and the occupant side portion of the airbag support are arranged such that the instrument panel side portion would expand before the occupant side portion upon deployment of the airbag.

FIG. 14 shows one example where the instrument panel side portion 15A and the occupant side portion 15B are arranged such that the instrument panel side portion 15A would expand before the occupant side portion 15B upon deployment of the airbag 11. In this example, the airbag 11, the instrument panel side portion 15A, and the occupant side portion 15B are arranged before stored into the airbag case 13, such that the wrapped top portion of the occupant side portion 15B is placed on the top of the airbag 11 and the wrapped top portion of the instrument panel side portion 15A is placed on the top portion of the occupant side portion 15B.

In the examples of FIGS. 11, 12, 14, the instrument panel side portion 15A, the occupant side portion 15B and the airbag 11 are substantially together wrapped and stored into the airbag case 13. In the examples shown in FIGS. 15, 16, however, the airbag 11 is first wrapped or folded like "bellows" and stored into the airbag case 13, and then the instrument panel side portion 15A and the occupant side portion 15B are wrapped and stored into the airbag case 13.

Figure 17:
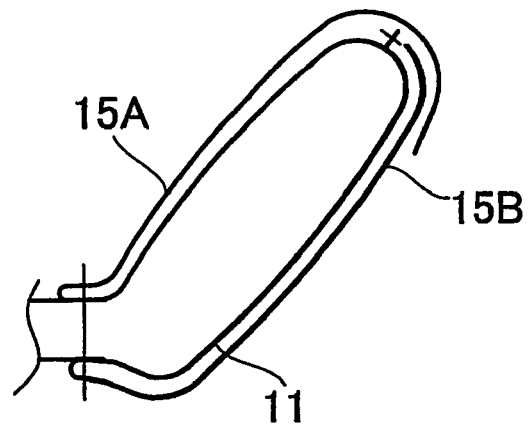
FIG. 17 is a sectional side view schematically illustrating one example where the airbag support including the instrument panel side portion and the occupant side portion and the airbag are integrally formed of a common base cloth.
Figure 18:
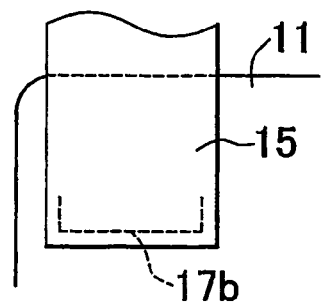
FIG. 18 is a view schematically illustrating one example where the expansion guide is formed by a stitch sewing the airbag and the airbag support together.
Figure 19:
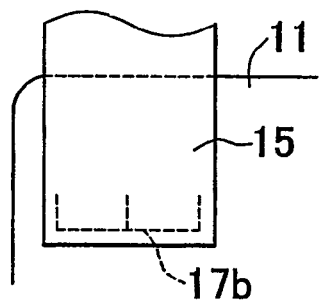
FIG. 19 is a view schematically illustrating one example where the expansion guide is formed by a stitch sewing the airbag and the airbag support together.
Figure 20:
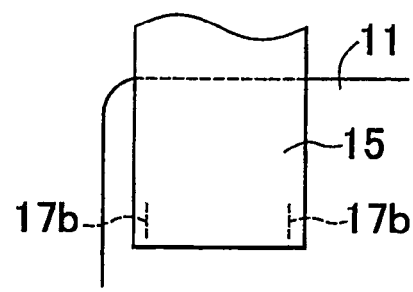
FIG. 20 is a view schematically illustrating one example where the expansion guide is formed by a stitch sewing the airbag and the airbag support together.
Figure 21:
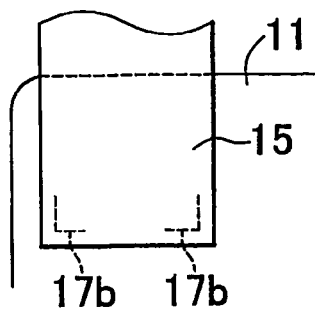
FIG. 21 is a view schematically illustrating one example where the expansion guide is formed by a stitch sewing the airbag and the airbag support together.

Also, the instrument panel side portion 15A and the occupant side portion 15B are formed separated from the airbag 11 in the above examples. In view of this, FIG. 17 shows one example where these portions and the airbag 11 are integrally formed of a common base cloth. This construction does not increase the number of necessary parts. and is therefore advantageous in terms of cost.

Also, in the examples shown in FIGS. 11 to 17, the instrument panel side portion 15A and the occupant side portion 15B are formed independent, and their end portions (i.e., top portions) can be overlapped. Therefore, it is possible to set a preferred size of each portion in accordance with functional requirements thereof.

Figure 15:
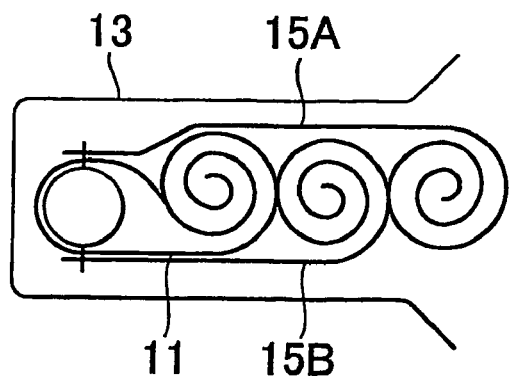
FIG. 15 is a sectional side view schematically illustrating one example where the airbag is first wrapped and stored into the airbag case, after which the instrument panel side portion and the occupant side portion of the airbag support are sequentially wound and stored into the same case.
Figure 16:
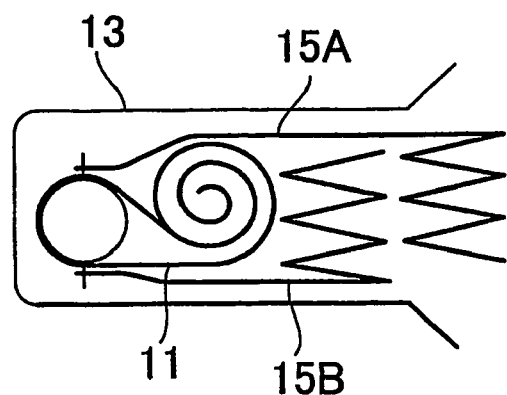
FIG. 16 is a sectional side view schematically illustrating one example where the airbag is first wrapped and stored into the airbag case, after which instrument panel side portion and the occupant side portion of the airbag support are folded like "bellows" and sequentially stored into the same case.

In the examples of FIGS. 15, 16, the instrument panel side portion 15A and the occupant side portion 15B, separately wrapped from each other and from the airbag 11, are stored within the airbag case 13 in such a way that the occupant side portion 15B is placed on the top the airbag 11 and the instrument panel side portion 15A is placed on the top of the occupant side portion 15B.

In this case, the airbag 11 is supported by the instrument panel side portion 15A and the occupant side portion 15B, which reduces the chances of the airbag 11 being displaced or deformed. Also, the instrument panel side portion 15A can be arranged so as to expand before the occupant side portion 15B upon deployment of the airbag 11, and the expanding behavior of each portion can be set independent of the airbag 11.

Next, FIGS. 18 to 33 show examples where an expansion guide is provided, which guides the airbag support 15 so that it stably expands in a preferred direction.

In these examples, the expansion guide is formed by a fixing stitch that is made of a thread 17b strong enough to withstand stress applied during expansion of the airbag support 15, with respect to the longitudinal direction of the vehicle (i.e., direction the airbag support 15 expands upon deployment of the airbag). In this case, a portion of a thread sewing the airbag support 15 to the airbag 11 may be used as the thread 17b, which is advantageous in terms of cost.

Figure 22:
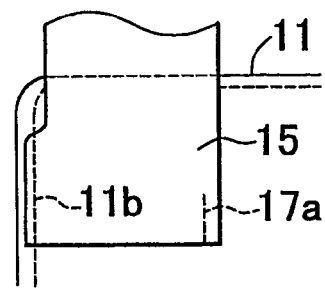
FIG. 22 is a view schematically illustrating one example where the expansion guide is formed by a portion of a stitch made to from the airbag.
Figure 23:
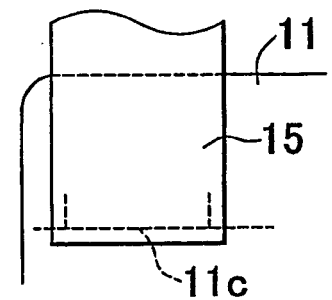
FIG. 23 is a view schematically illustrating one example where the expansion guide if formed by a portion of a stitch sewing a tether to the airbag.
Figure 24:
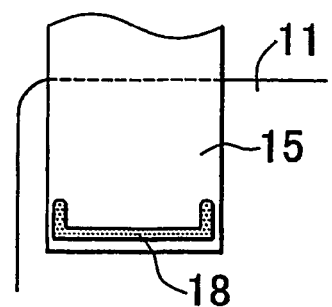
FIG. 24 is a view schematically illustrating one example where an adhered potion of the airbag support through which the airbag support is attached to the airbag is formed using adhesive such that at least one portion of the adhered portion extends along a direction the airbag support would expand upon deployment of the airbag.
Figure 25:
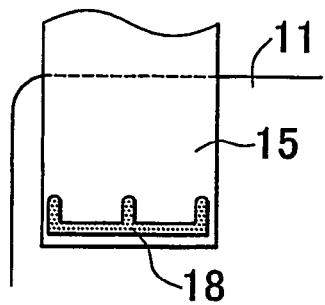
FIG. 25 is a view schematically illustrating another example where the adhered potion is formed.
Figure 26:
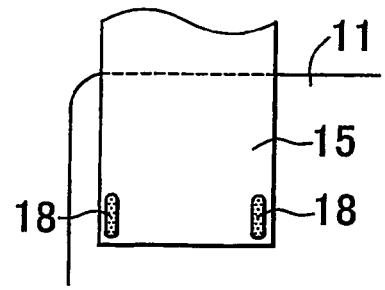
FIG. 26 is a view schematically illustrating another example where the adhered potion is formed.
Figure 27:
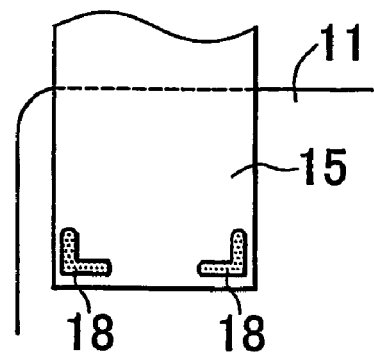
FIG. 27 is a view schematically illustrating another example where the adhered potion is formed.
Figure 28:
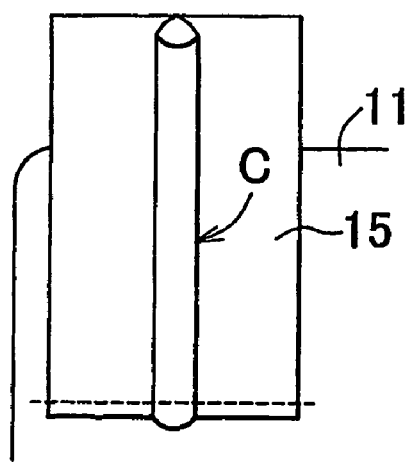
FIG. 28 is a view schematically illustrating one example where a reinforcement is formed by a portion of the airbag support sewn into a specific form.
Figure 29:
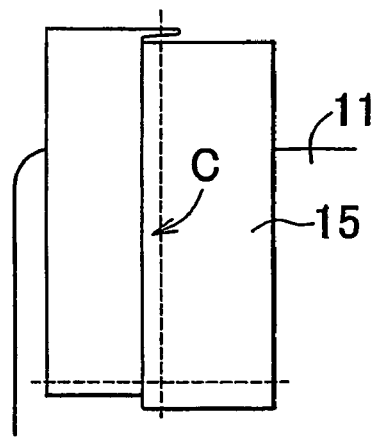
FIG. 29 is a view schematically illustrating another example where the reinforcement is formed by a portion of the airbag support sewn into a specific form.
Figure 30:
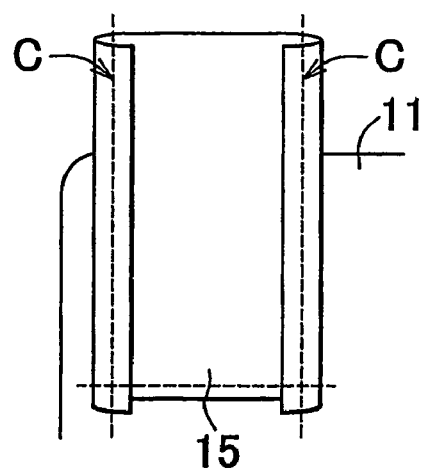
FIG. 30 is a view schematically illustrating another example where the reinforcement is formed by a portion of the airbag support sewn into a specific form.
Figure 31:
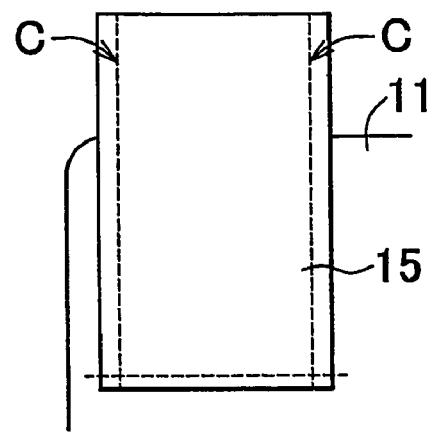
FIG. 31 is a view schematically illustrating one example where the reinforcement is formed by a portion of the airbag support at which a stitch is made.

For example, in the example of FIG. 22, a portion of the thread 11b forms the fixing stitch extending along the direction the airbag support 15 would expand upon deployment of the airbag 11. Similarly, in the example of FIG. 23, a portion of the thread 11c sewing the tether 11c to the airbag 11 forms the fixing stitch. There are just examples indicating the fixing stitch can easily be formed.

FIGS. 24 to 27 illustrate examples where the expansion guide is formed by an adhered portion of the airbag support 15 through which the airbag support 15 is attached to the airbag 11. The adhered potion is formed using adhesive (e.g., thermal adhesive) 18 so that at least one portion of the adhered portion extends along the longitudinal direction of the vehicle (i.e., direction the airbag support 15 expands upon deployment of the airbag). In this example, the adhesive applied to attach the airbag support 15 to the airbag 11 may be utilized to form the adhered portion, which is advantageous in terms of cost.

Other examples are shown in FIGS. 28 to 33, where the expansion guide is formed by a reinforcement C of the airbag support 15. Referring to the drawings, the reinforcement C is provided independent of the airbag 11, and it is therefore possible to easily form the reinforcement C into a desired shape, and thus achieve improved flexibility in setting a target effect associated therewith.

Figure 32:
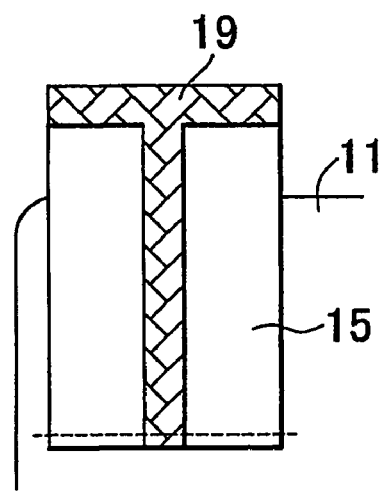
FIG. 32 is a view schematically illustrating one example where the reinforcement is formed by a portion of the airbag support on which sealing substance is applied.
Figure 33:
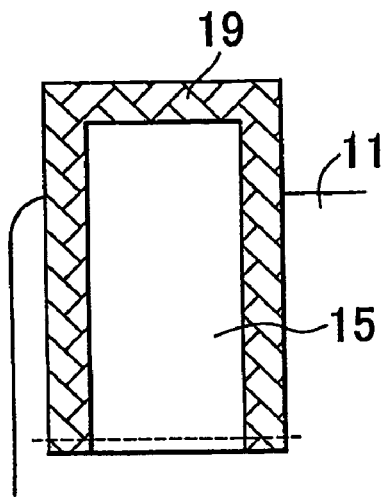
FIG. 33 is a view schematically illustrating another example where the reinforcement is formed by a portion of the airbag support on which sealing substance is applied.

In the examples of FIGS. 28 to 31, the reinforcement C is formed by a sewn portion of the airbag support 15. In this case, the equipment for sewing the airbag 11 can be utilized to form the reinforcement C so that no additional equipment cost will therefore be required. In the examples of FIGS. 32, 33, the reinforcement C is formed by a portion of the airbag support 15 on which sealing substance 19 is applied to improve the airtightness of that portion. In this case, too, the equipment for applying sealing substance to the airbag 11 may be utilized to form the reinforcement C so that no additional equipment cost will therefore be required.

Figure 34:
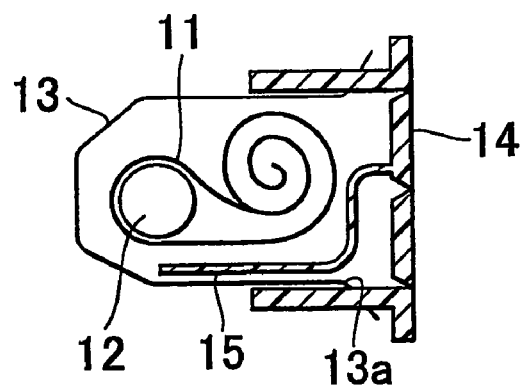
FIG. 34 is a sectional side view schematically illustrating one example where the airbag support is formed as one portion of the airbag cover.
Figure 35:
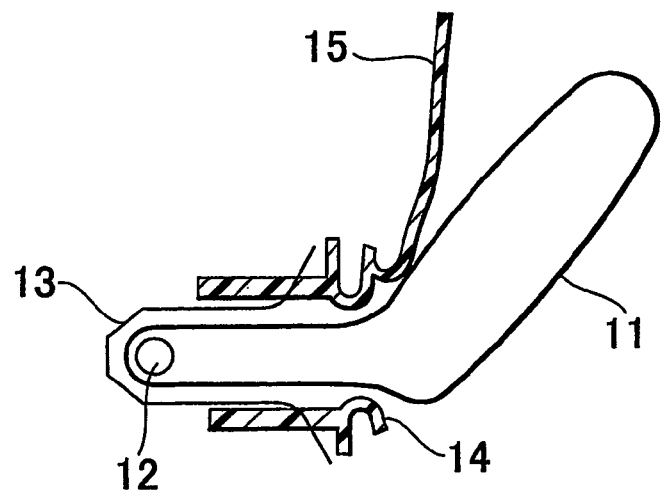
FIG. 35 is a sectional side view showing a case where the airbag shown in FIG. 34 has been deployed.
Figure 36:
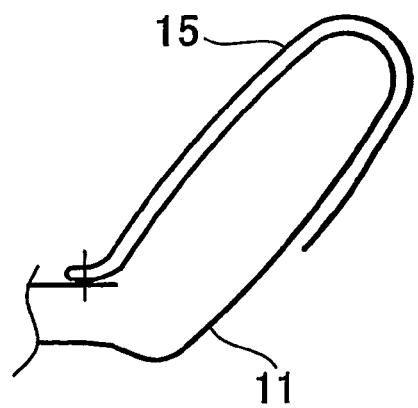
FIG. 36 is a sectional side view schematically illustrating one example where the airbag support and the airbag are integrally formed of a common base cloth.

Other examples are shown in FIGS. 34, 35 where the airbag support 15 is formed as one portion of an airbag cover 14 covering the opening 13a of the airbag case 13 such that it will open to release the airbag 11 upon its deployment. This construction does not increase the number of necessary parts or components, and is therefore advantageous in terms of cost. In one example shown in FIG. 36, the airbag support 15 and the airbag 11 are integrally formed of a common base cloth, which does not increase the number of necessary parts or components and is therefore advantageous in terms of cost.

Figure 37:
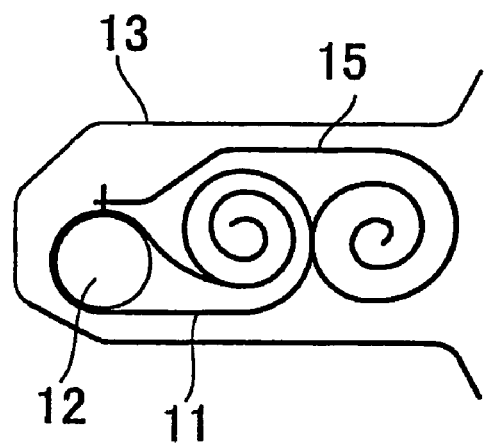
FIG. 37 is a sectional side view schematically illustrating one example where the airbag and the airbag support are wrapped separately and stored within the airbag case.
Figure 38:
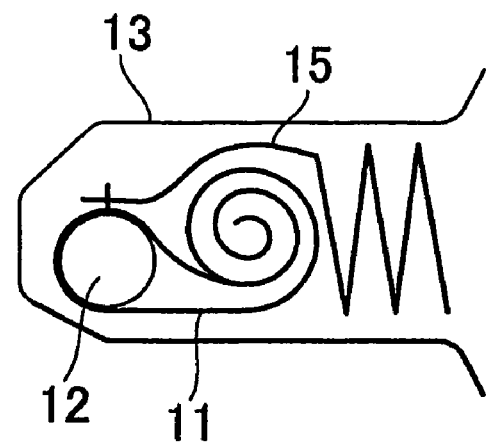
FIG. 38 is a sectional side view schematically illustrating another example where the airbag and the airbag support are wrapped separately and stored within the airbag case.

Other examples are shown in FIGS. 37, 38 where the airbag support 15 attached to the airbag 11 is wrapped and stored within the airbag case 13 separately from the airbag 11. In this case, the expanding behavior of the airbag support 15 can be set independent of the airbag 11. Also, since the airbag support 15 is placed on the airbag 11 within the airbag case 13, it reduces the chances of the airbag 11 being displaced or deformed.

Figure 39:
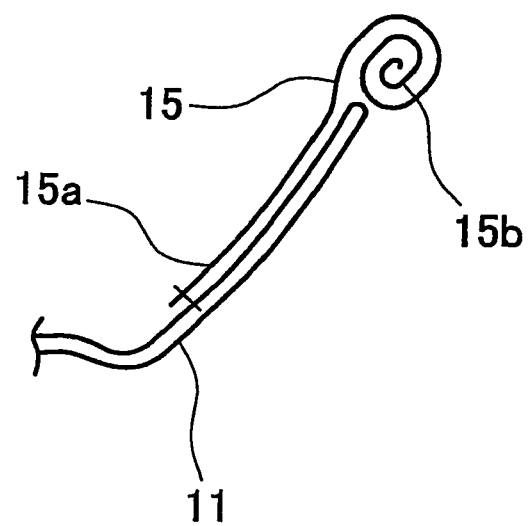
FIG. 39 is a sectional side view schematically illustrating one example where the airbag support is attached at the bottom portion to the airbag, and the airbag support and the airbag are stored with the top portion of the airbag support separately wrapped from the airbag.
Figure 40:
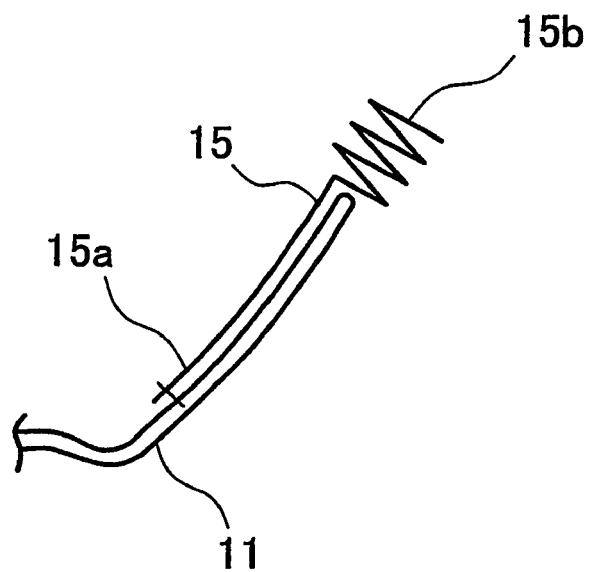
FIG. 40 is a sectional side view schematically illustrating one example where the airbag support is attached at the bottom portion to the airbag, and the airbag support and the airbag are stored with the top portion of the airbag support separately wrapped (folded) from the airbag.

Other examples are shown in FIGS. 39, 40 where the airbag support 15 is adhered at the bottom portion 15a to the airbag 11, and the top portion 15b is separately wrapped from the airbag 11 while other portion of the airbag support 15 is wrapped together with the airbag 11. In this case, the top portion 15b, upon deployment of the airbag 11, is not restricted by the airbag 11 and therefore quickly expands, and the expansion of the airbag support 15 finishes before the deployment of the airbag 11.

Other examples are shown in FIGS. 41 to 46 where the top portion 15b of the airbag support 15 is formed as a free end portion including an anchor portion D. In this case, upon deployment of the airbag 11, the expanding force of the airbag 11 acts on the anchor portion D so that the airbag support 15 quickly expands with respect to the instrument panel 24.

Figure 41:
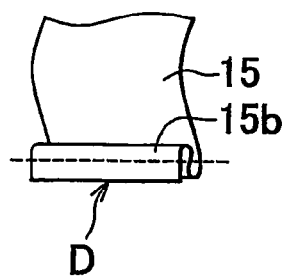
FIG. 41 is a view schematically illustrating one example where an anchor portion is formed by the top portion of the airbag support that has been folded twice and sewn to the airbag support.
Figure 42:
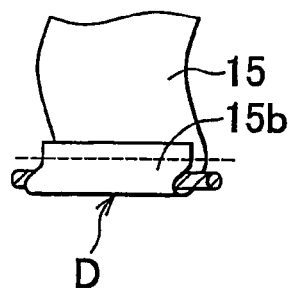
FIG. 42 is a view schematically illustrating one example where the anchor portion is formed by the top portion folded once and sewn to the airbag support so as to form a loop and a bar provided in that loop.
Figure 46:
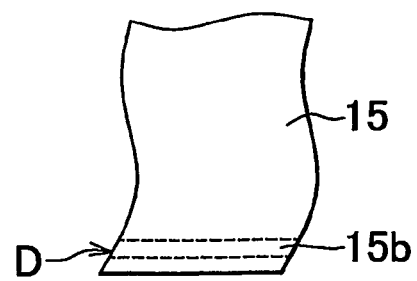
FIG. 46 is a view schematically illustrating one example where the anchor portion is formed by the top portion of the airbag support on which two stitches have been made.

In the example of FIG. 41, the anchor portion D is formed by the top portion 15b folded twice and sewn to the airbag support 15. In FIG. 42, the anchor portion D is formed by the top portion 15b folded once and sewn to the airbag support 15 so as to form a loop and a bar provided in that loop. In the example of FIG. 46, the anchor portion D is formed by two stitches made at the top portion 15b. According to these examples, the equipment for sewing the airbag 11 can be utilized to form the anchor portion D so that no additional equipment cost will therefore be required.

Figure 43:
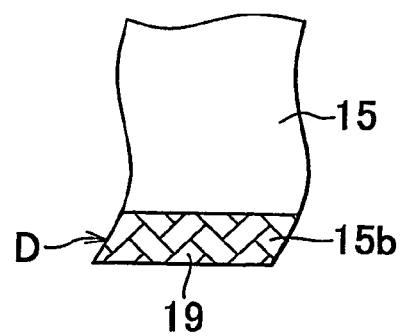
FIG. 43 is a view schematically illustrating one example where the anchor portion is formed by the top portion on which sealing substance is thinly applied.
Figure 44:
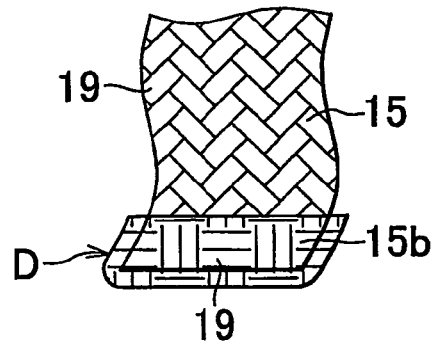
FIG. 44 is a view schematically illustrating one example where the anchor portion is formed by the top portion of the airbag support where the sealing substance is additionally applied onto a thin layer of the same substance that has already been created throughout the entire surface of the airbag support.
Figure 45:
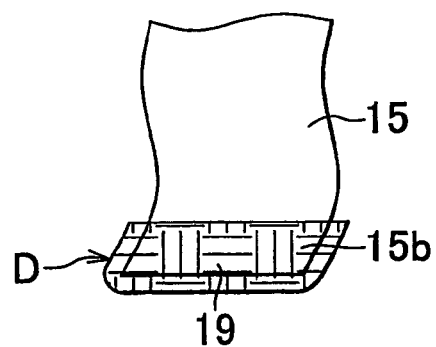
FIG. 45 is a view schematically illustrating one example where the anchor portion is formed by the top portion of the airbag support on which the sealing substance is thickly applied.

In the example of FIG. 43, the anchor portion D is formed by the top portion 15b on which sealing substance 19 is thinly applied. In the example of FIG. 44, the anchor portion D is formed by the top portion 15b of the airbag support 15 where the sealing substance 19 is additionally applied onto a thin layer of the same substance that has already been created throughout the entire surface of the airbag support 15. According to these examples, the anchor portion D can be formed using the same equipment as used to apply the sealant to the airbag, thus requiring no additional equipment cost.

Other examples are shown in FIGS. 47 to 50 where a friction reducer for reducing the friction between the airbag support 15 and the airbag 11 is provided to minimize the chances of the airbag support 15 being caught by the airbag 11 when the airbag support 15 expands upon deployment of the airbag 11. In the example of FIG. 47, the friction reducer is formed by a layer of sealing substance created between the airbag support 15 and the airbag 11. More specifically, the sealing substance is thinly applied to the airbag support 15 so that the layer of sealing substance is created between the airbag support 15 and the airbag 11. If the sealing substance is also applied to the airbag 11, the effect of smoothing the relative motions of the airbag 11 and the airbag support 15 can be further improved. Thus, in this case, the sealing substance can be utilized to reduce the friction between the airbag 11 and the airbag support 15.

Other examples are shown in FIGs. 48 and 49, where the friction reducer is formed by two or more separate portions of the airbag support 15 that are overlapped or a portion of the airbag support 15 folded onto itself. With thus overlapped portions of the airbag support 15, the relative motions of the airbag 11 and the airbag support 15 are made smooth so that the airbag support 15 would smoothly and quickly expand with respect to the instrument panel.

Another example is shown in FIG. 50 where the friction reducer is formed by an arrangement of the airbag support 15 and the airbag 11 where their weave directions are different. This arrangement can be easily accomplished by appropriately setting the direction of cutting out the airbag support 15 from the base cloth, and a preferred effect of reducing the friction may be achieved by setting that direction appropriately.

Figure 52:
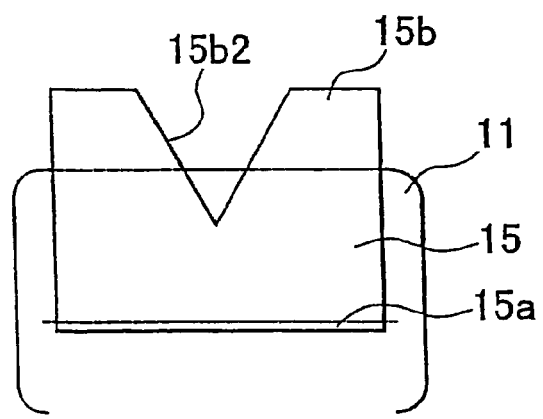
FIG. 52 is a view schematically illustrating one example where the peripheral length of the top side of the airbag support is made longer than the bottom side of the airbag support by forming a V-shaped notch substantially at the center of the same top side.

Other examples are shown in FIGS. 51 to 59 where the airbag support 15 is attached at the bottom portion 15a to the airbag 11 while the top portion 15b is free, and the peripheral length of the top side of the airbag support 15 is longer than the bottom side of the airbag support 15. In the example of FIG. 51 a half-round notch 15b1 is formed substantially at the center of the top side of the airbag support 15 so that the peripheral length of the top side is longer than the bottom side of the airbag support 15. In the example of FIG. 52, likewise, a V-shaped notch 15b2 is formed substantially at the center of the top side of the airbag support 15 so that the peripheral length of the top side is longer than the bottom side of the airbag support 15.

Figure 53:
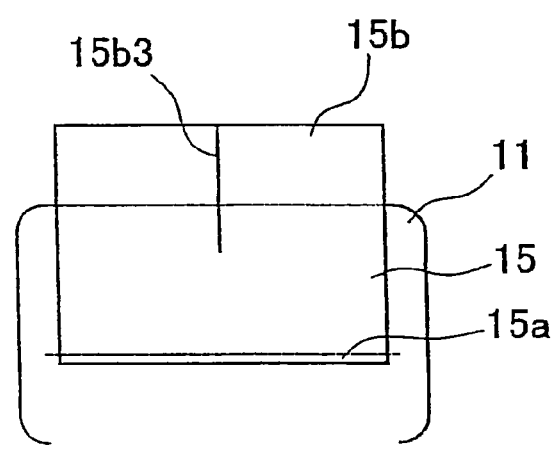
FIG. 53 is a view schematically illustrating one example where the peripheral length of the top side of the airbag support is made longer than the bottom side of the airbag support by forming a slit notch substantially at the center of the same top side.
Figure 54:
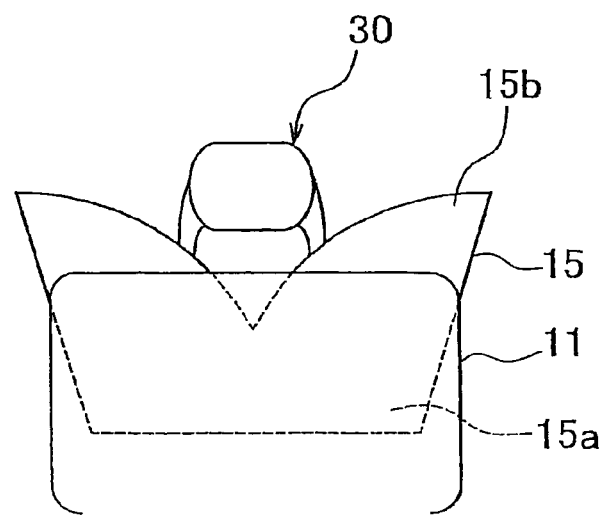
FIG. 54 is a view schematically showing a state where the airbag support of FIG. 53, as viewed from the opposite side, has expanded.
Figure 55:
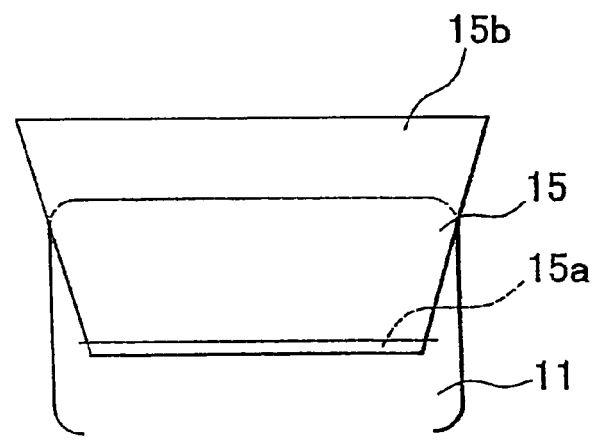
FIG. 55 is a view schematically illustrating one example where the peripheral length of the top side of the airbag support is made longer than the bottom side of the airbag support by forming the airbag support in a trapezoidal shape.
Figure 56:
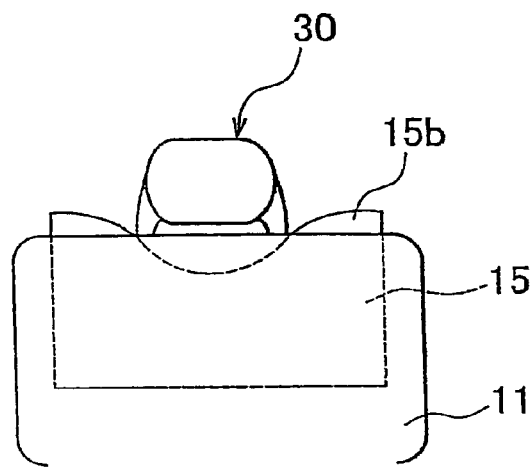
FIG. 56 is a view schematically showing a state where the airbag support of FIG. 55, as viewed from the opposite side, has expanded.
Figure 57:
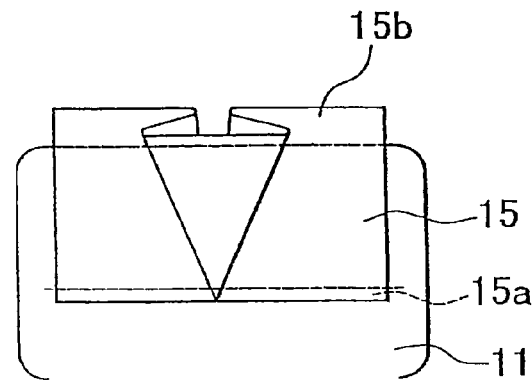
FIG. 57 is a view schematically illustrating one example where the peripheral length of the top side of the airbag support is made longer than the bottom side of the airbag support by providing a portion of the airbag support folded in a fan-like shape.
Figure 58:
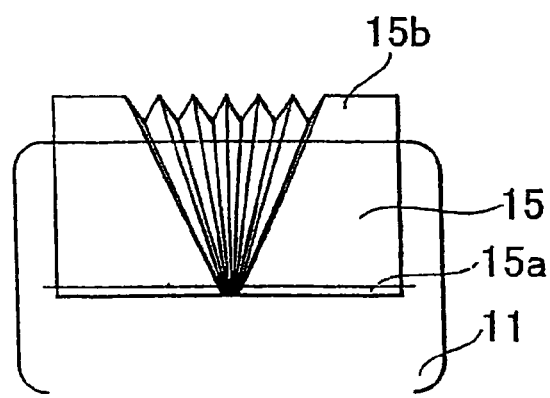
FIG. 58 is a view schematically illustrating another example where the peripheral length of the top side of the airbag support is made longer than the bottom side of the airbag support by providing a portion of the airbag support folded in a fan-like shape.
Figure 59:
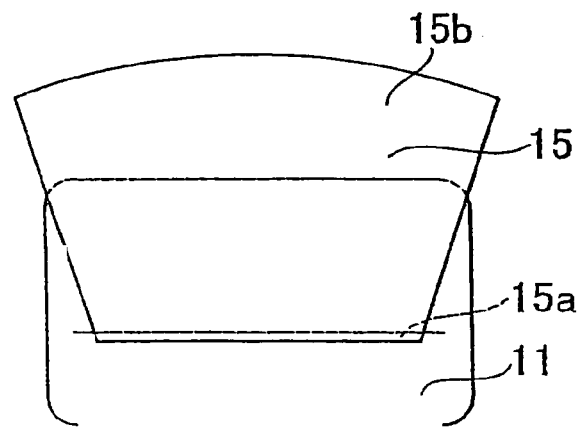
FIG. 59 is a view schematically illustrating another example where the peripheral length of the top side of the airbag support is made longer than the bottom side of the airbag support by providing a portion of the airbag support folded in a fan-like shape.
Figure 60:
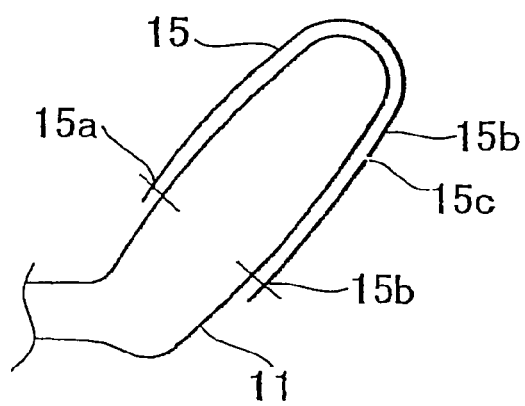
FIG. 60 is a sectional side view schematically illustrating one example where the peripheral length of the top side of one portion of the airbag support is made longer than the top side of another portion of the airbag support when the airbag support has been split at a cut-off portion into those portions.
Figure 61:
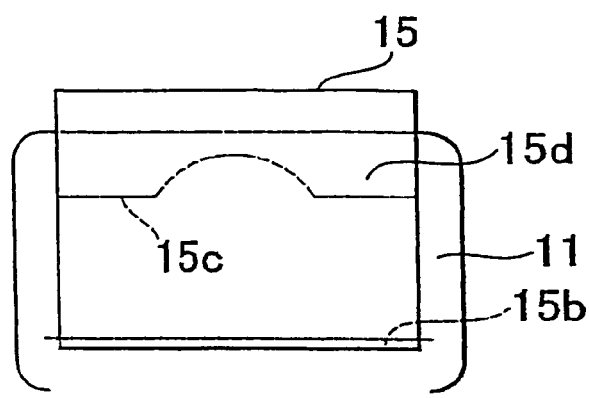
FIG. 61 is a back view showing the airbag support and the airbag in FIG. 60.
Figure 62:
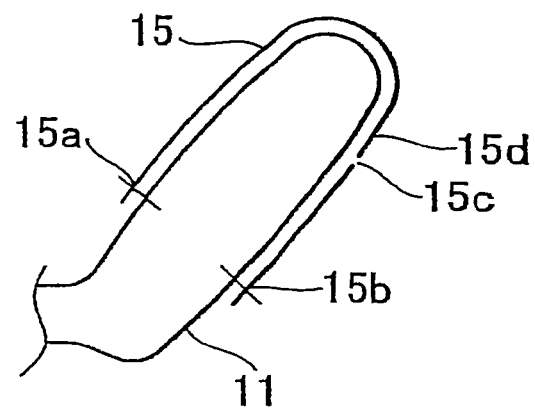
FIG. 62 is a sectional side view schematically illustrating another example where the peripheral length of the top side of one portion of the airbag support is made longer than the top side of another portion of the airbag support when the airbag support has been split at a cut-off portion into those portions.
Figure 63:
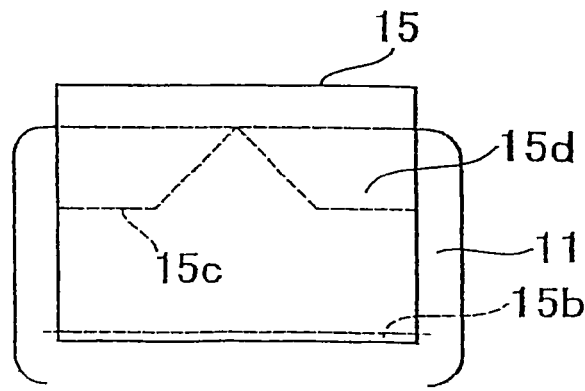
FIG. 63 is a back view showing the airbag support and the airbag in FIG. 62.

In the example shown in FIGS. 53 and 54, a slit 15b3 of a predetermined length is made substantially at the center of the top portion 15b. Referring to FIG. 54, the top portion 15b of the airbag support 15, upon deployment of the airbag 11, opens at the slit 15b3 when it contacts and is thus pressed by a protrusion, such as a steering column 30, so that the peripheral length of the top side becomes longer than the bottom side of the airbag support 15 as indicated in FIG. 54. In the examples of FIGS. 55 and 56, the airbag support 15 is formed trapezoidal so that the length of the top side of the airbag support 15 is longer than the bottom side of the airbag support 15. In the examples of FIGS. 57 and 58, the top portion 15b of the airbag support 15 is formed like a "folding fan" so that the length of the top side of the airbag support 15 becomes longer than the bottom side when the airbag support 15 has expanded. In the example of FIG. 59, the airbag support 15 is formed in a fan-like shape so that the length of top edge of the airbag support 15 is longer than the bottom side.

Other examples are shown in FIGS. 60 to 63 where a cut-off line 15c is formed to split the airbag support 15 into two portions corresponding to the instrument panel side and the occupant side of the airbag 11, respectively. The cut-off line 15c is formed in such a shape that, when the airbag support has been split into such two portions, the peripheral length of the top side of one of the portions is longer than that of the other portion. For example, the center portion of the cut-off line 15c may be formed in a V-shape as shown FIGS. 62 and 63.

According to the examples of FIGS. 51 to 59 where the length of the top side of the airbag support 15 is longer than its bottom side, and the examples of FIGS. 60 to 63 where the top side of one of the two portions of the airbag support 15 is longer than that of the other portion, the airbag support 15, even if there is a protrusion like the steering column 30, can smoothly expand by avoiding that protrusion.

The invention claimed is:

1. A knee protection apparatus for an occupant of a vehicle, comprising:
   an airbag disposed in front of a knee of the occupant;
   an inflator for supplying gas to the airbag upon collision of the vehicle so that the airbag is deployed by the supplied gas; and
   a non-inflatable airbag support that is directly attached to the airbag and is structured to expand upon deployment of the airbag so as to provide a barrier between the instrument panel and the airbag,
   wherein one end portion of the airbag support is free,
   the airbag support extends in such a way that the one end portion of the airbag support separates upward and moves upward above the airbag upon the deployment of the airbag, and
   the other end portion of the airbag support is directly attached at the airbag, the other end portion being located in a lower side of the airbag support when the airbag has deployed.

2. The knee protection apparatus according to claim 1, wherein the airbag support includes a temporarily attached portion that is detached from the airbag upon the deployment of the airbag.

3. The knee protection apparatus according to claim 1, wherein the airbag support includes an instrument panel side portion provided to one side of the airbag that is closer to the instrument panel and an occupant side portion provided to the other side of the airbag that is closer to the occupant.

4. The knee protection apparatus according to claim 3, wherein the airbag support includes a cut-off portion at which the airbag support is split upon the deployment of the airbag.

5. The knee protection apparatus according to claim 3, wherein the instrument panel side portion and the occupant side portion of the airbag support are temporarily attached to each other, so that they are detached upon the deployment of the airbag.

6. The knee protection apparatus according to claim 3, wherein the instrument panel side portion and the occupant side portion are arranged such that the instrument side portion expands before the occupant side portion upon the deployment of the airbag.

7. The knee protection apparatus according to claim 3, further including an airbag case for storing the airbag, wherein the instrument side portion and the occupant side portion of the airbag support are wrapped separately and stored within the airbag case together with the airbag in such a way that the airbag wrapped is covered by the occupant side portion and the occupant side portion is covered by the instrument panel side portion.

8. The knee protection apparatus according claim 1, wherein the airbag support is provided with an expansion guide for guiding the airbag support to stably expand in a predetermined expanding direction.

9. The knee protection apparatus according to claim 8, wherein the expansion guide is a guide stitch sewing the airbag support and the airbag together, at least one portion of the guide stitch extending along the predetermined expanding direction.

10. The knee protection apparatus according to claim 9, wherein the guide stitch is formed by a portion of a stitch made to form the airbag.

11. The knee protection apparatus according to claim 9, further comprising a tether, wherein the guide stitch is formed by a portion of a stitch sewing the tether to the airbag.

12. The knee protection apparatus according to claim 8, wherein the expansion guide is formed by a reinforcement provided in the airbag support, at least one portion of the reinforcement extending along the predetermined expanding direction.

13. The knee protection apparatus according to claim 12, wherein the reinforcement is formed by a portion of the airbag support that is sewn into a specific form or at which a stitch is made.

14. The knee protection apparatus according to claim 12, wherein the reinforcement is formed by a portion of the airbag support on which sealing substance is applied.

15. The knee protection apparatus according to claim 1, wherein the airbag support and the airbag are integrally formed of a common base cloth.

16. The knee protection apparatus according to claim 1, wherein the airbag support and the airbag are separately wrapped and stored.

17. The knee protection apparatus according to claim 1, the one end portion of the airbag support being a top portion another end portion of the airbag support being a bottom portion,
   wherein the airbag support is attached at the bottom portion to the airbag, and the airbag support and the airbag are stored with the top portion of the airbag support being separately wrapped from the airbag.

18. The knee protection apparatus according to claim 1, further comprising:
   an airbag case in which the airbag is stored and wrapped,
   wherein the airbag and the airbag support are wrapped separately and stored in the airbag case in such a way that the airbag support covers the airbag in the same airbag case.

19. The knee protection apparatus according to claim 1, wherein an anchor portion is provided at the one end portion.

20. The knee protection apparatus according to claim 19, wherein the anchor portion is formed by a portion of the airbag support on which sealing substance is applied.

21. The knee protection apparatus according to claim 19, wherein the anchor portion is formed by a portion of the airbag support that is sewn into a specific form or at which a stitch is made.

22. The knee protection apparatus according to claim 1, wherein the airbag support is provided with a friction reducer for reducing friction between the airbag support and the airbag.

23. The knee protection apparatus according to claim 22, wherein the friction reducer is formed by a layer of sealing substance created on one side of the airbag support closer to the airbag.

24. The knee protection apparatus according to claim 22, wherein the friction reducer is formed by overlapped portions of the airbag support.

25. The knee protection apparatus according to claim 22, wherein the friction reducer is formed by an arrangement of the airbag support and the airbag in which a weave direction of base cloth of the airbag and a weave direction of base cloth of the airbag support are different.

26. The knee protection apparatus according to claim 1, the one end portion of the airbag support being a top portion and another end portion being a bottom portion, wherein the airbag support is attached at the bottom portion to the airbag while the top portion is free, and a peripheral length of a top side of the airbag support is longer than a peripheral length of a bottom side of the airbag support.

27. A knee protection apparatus for an occupant of a vehicle, comprising:
   an airbag disposed in front of a knee of the occupant;
   an inflator for supplying gas to the airbag upon collision of the vehicle so that the airbag is deployed by the supplied gas;
   a non-inflatable airbag support that is structured to expand upon deployment of the airbag so as to provide a barrier between the instrument panel and the airbag;
   an airbag case, in which the airbag is stored and wrapped; and
   an airbag cover for covering an opening of the airbag case,
   wherein the airbag support and the airbag cover are integrally formed and the airbag support is stored in the airbag case,
   wherein one end portion of the airbag support is free,
   the airbag support extends in such a way that the one end portion of the airbag support separates upward from the airbag and moves upward above the airbag upon the deployment of the airbag, and
   the other end portion of the airbag support is integrally formed at the airbag cover, the other end portion being located in a lower side of the airbag support when the airbag has deployed.

* * * * *